Oct. 15, 1963          N. COHN          3,107,305
AREA-REQUIREMENT GOVERNOR FOR GENERATING UNITS
Filed May 27. 1960                         3 Sheets-Sheet 1

Oct. 15, 1963          N. COHN          3,107,305
AREA-REQUIREMENT GOVERNOR FOR GENERATING UNITS
Filed May 27, 1960                            3 Sheets-Sheet 3

United States Patent Office 3,107,305
Patented Oct. 15, 1963

3,107,305
AREA-REQUIREMENT GOVERNOR FOR GENERATING UNITS
Nathan Cohn, Jenkintown, Pa., assignor to Leeds and Northrup Company, Philadelphia, Pa., a corporation of Pennsylvania
Filed May 27, 1960, Ser. No. 32,240
11 Claims. (Cl. 307—57)

This invention relates to control of generating units of an area operating under a power-interchange schedule with a distribution system including one or more other generating areas.

Generally in accordance with the present invention, each of one or more individual generating units of a generation area is provided with a governor system which instead of being responsive to changes in system speed, as now is conventional practice, is directly and continuously responsive to deviations from the area interchange schedule to vary the input and therefore the corresponding output of the unit in accordance with the sense and magnitude of such deviations.

In accordance with one form of the present invention, the conventional speed-responsive device of the governor of each of one or more generating units of an area is retained but is driven at a speed which is varied, not with the speed of the unit or exclusively with system-frequency, as with conventional speed governors, but with the deviations from the scheduled interchange of power between that area and the remainder of the distribution system. More specifically, an existing area requirement, i.e., a deviation from the scheduled interchange of the area, is converted to a change in speed of the driving motor for the fly-balls of the governor of the generating unit.

Further in accordance with the invention, the slope of the area requirement/unit-generation characteristic of an individual generating unit may be changed to predetermine the extent to which that unit participates in assisting the area to correct its deviation from schedule, and the intercept of such characteristic with the zero area-requirement axis may be shifted to obtain a different base generation which remains constant for different values of total sustained generation of the area or which may be shifted as a function of total sustained generation of the area for economic generation or distribution of power.

The invention further resides in governor systems for generating units having features hereinafter described and claimed.

Figure 1:
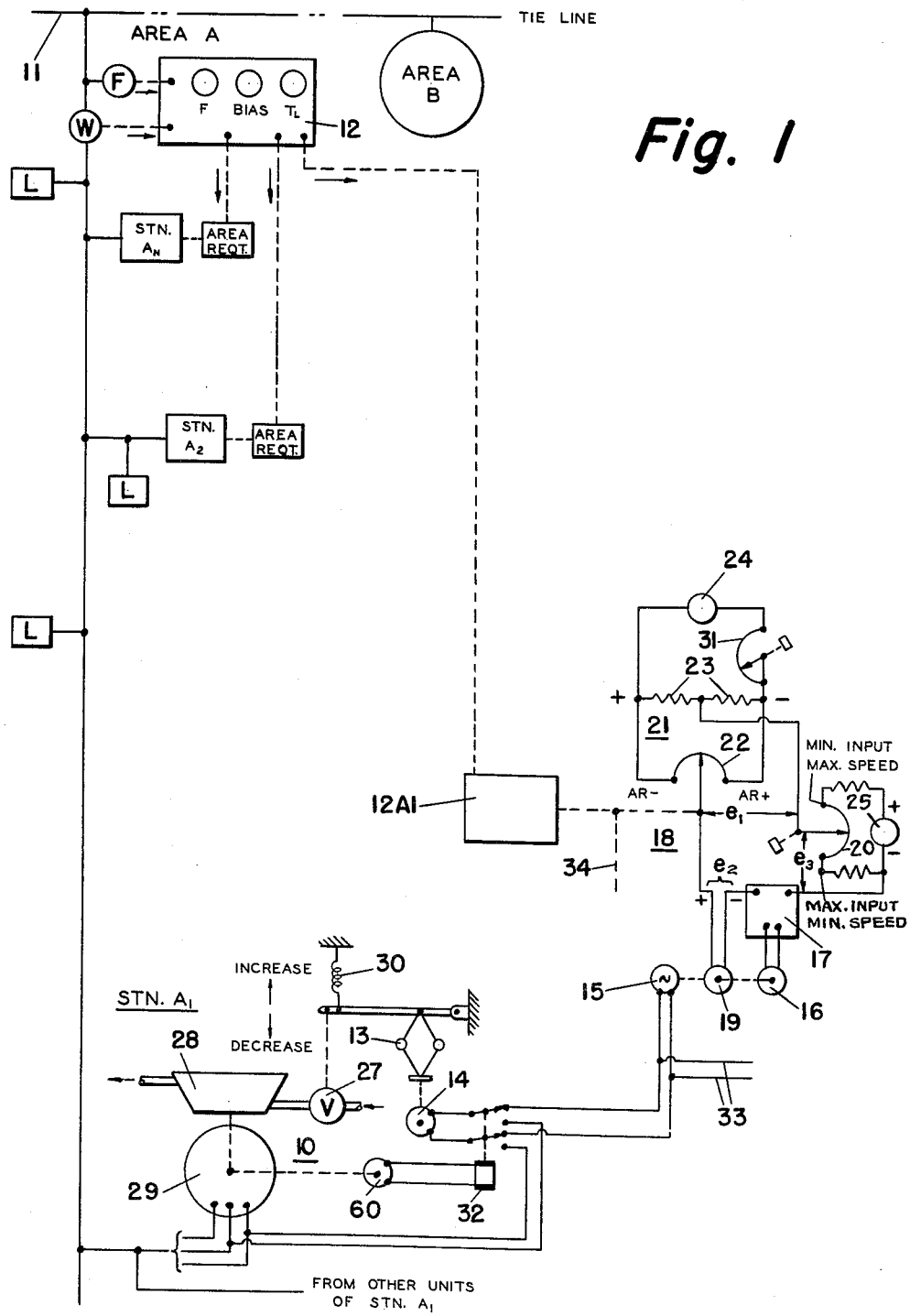
Figure 1A:
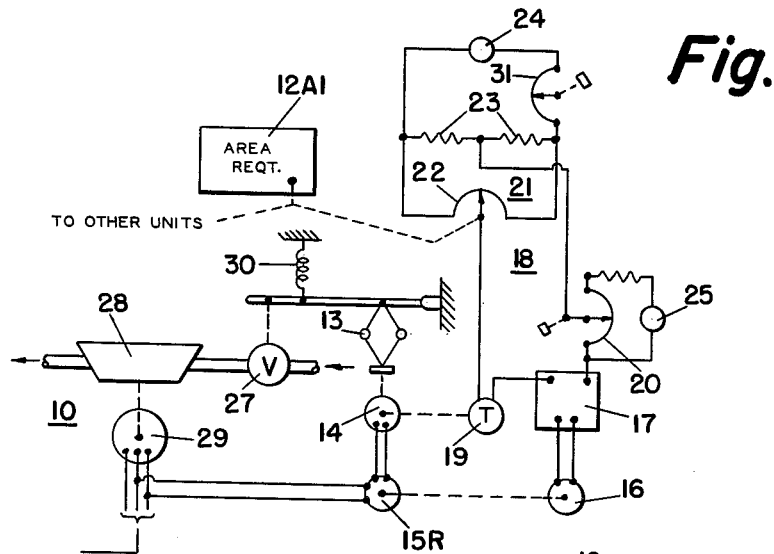
Figure 3:
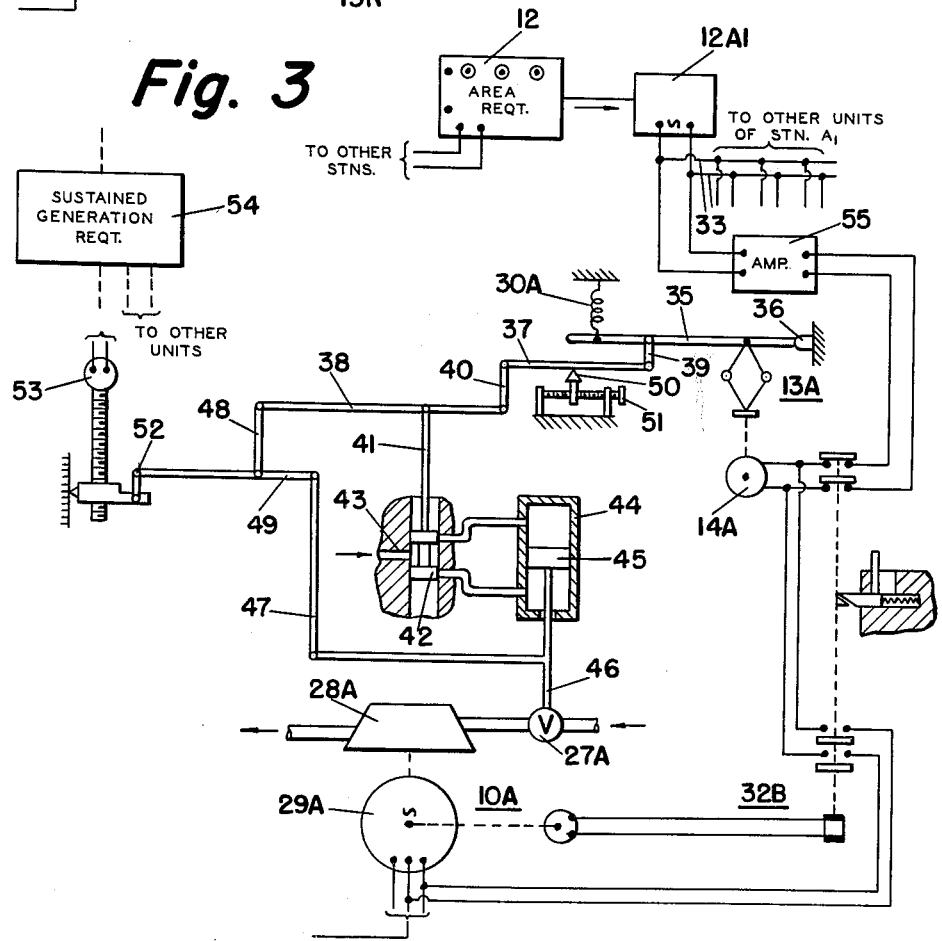
Figure 2:
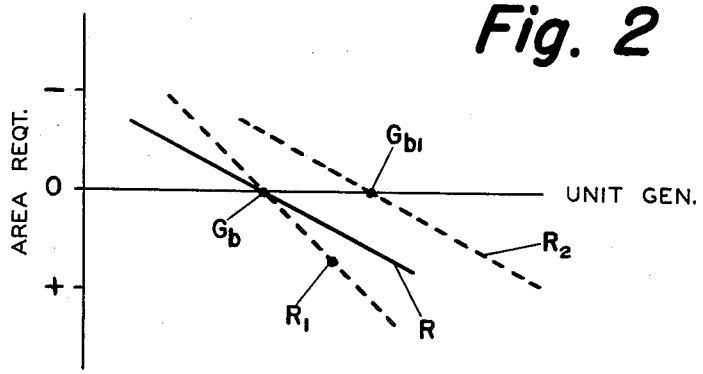
Figure 4:
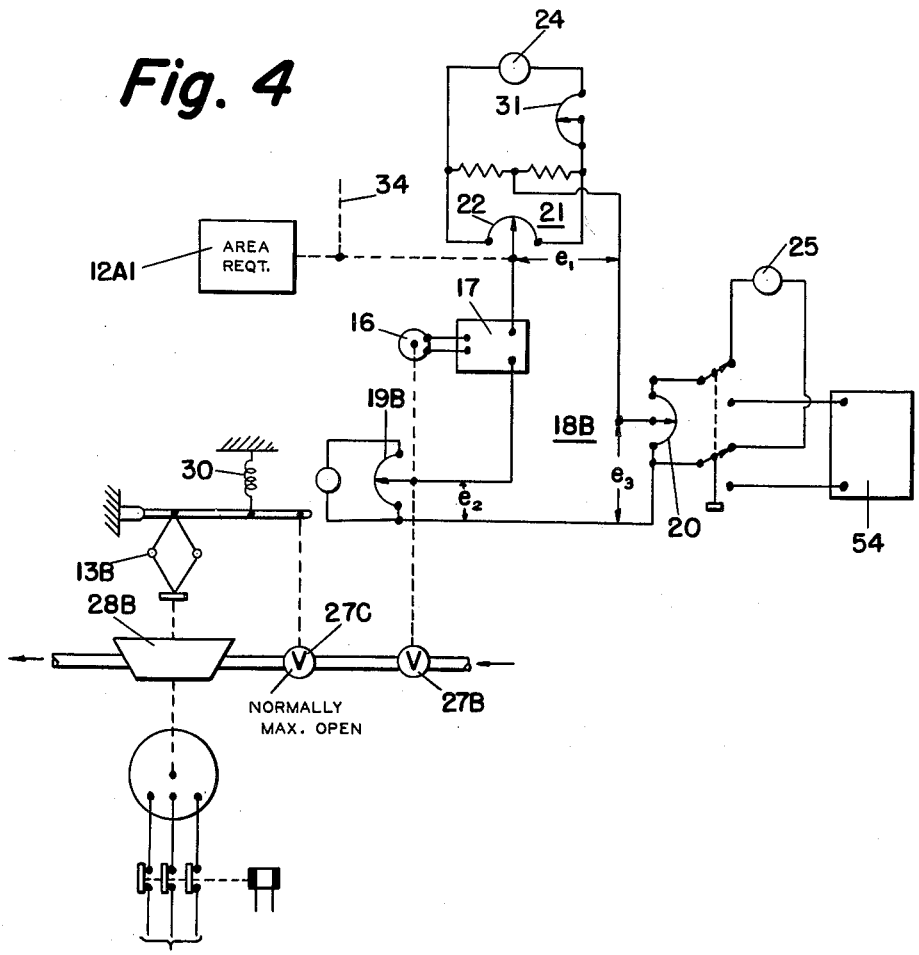

For a more detailed understanding of the invention, reference is made in the following description of preferred embodiments thereof to the accompanying drawings in which:

FIG. 1 diagrammatically illustrates a power distribution network or system having at least two areas, each including at least one generating unit controlled by an area-requirement governor in accordance with the invention;

FIG. 1A diagrammatically illustrates a modification of the area-requirement governor shown in FIG. 1;

FIG. 2 illustrates area-requirement governor characteristics discussed in connection with FIGS. 1 and 1A; and FIGS. 3 and 4 illustrate modifications of the governor system of FIG. 1.

Referring to FIG. 1, the generating unit 10 is included in a generating area A interconnected by tieline 11 to one or more other generating areas, such as area B, of a power distribution system. Each area has its own generating sources, exemplified by stations $A_1$–$A_N$ of area A and its own local load, exemplified by blocks L of area A. It is assumed for purpose of explanation that area A, under terms of an agreement between the areas, is obligated to supply tieline power to the system on a schedule which may be based on a constant interchange of power or upon an interchange varying with frequency, i.e., a frequency-biased interchange. Under such circumstance, the generation required of area A is increased above or decreased below that necessary to satisfy its local load by an amount corresponding with the scheduled interchange. So far as the obligation of area A to the rest of the distribution system is concerned, it is discharged when the "Area Requirement," i.e., the deviation from the scheduled interchange, is zero.

Arrangements suited for producing a signal representative of "Area Requirement" are disclosed in Carolus Patent 2,688,728, Phillips Patent 2,754,429, and Cohn Patents 2,773,994, 2,831,125, 2,866,102 and 2,923,832. A typical arrangement is represented in FIG. 1 by block 12.

The "Area Requirement" is computed from the following equation:

$$E=(T_0-T_1)-10B(F_0-F_1) \quad (1)$$

or $$E=\Delta T-10B(\Delta F) \quad (2)$$

where:

E is area requirement, in megawatts
$T_0$ is the area net interchange schedule, in megawatts, at normal frequency
$T_1$ is the prevailing area net interchange, in megawatts
$\Delta T$ is the deviation, in megawatts from $T_0$
$F_0$ is the frequency schedule in cycles per second
$F_1$ is the prevailing frequency in cycles per second
$\Delta F$ is the frequency deviation, in cycles per second, from $F_0$
B is the area bias, in megawatts per one-tenth cycle The algebraic convention for Equations 1 and 2 is to consider power flow out of an area as plus. Bias is a minus quantity, reflecting the negative slope of the bias characteristic.

Time, acceleration and other factors may be introduced into the computation as discussed in the foregoing patents.

The area-requirement signal, or selected percentage thereof, is transmitted in any suitable manner from the master controller 12 to various stations of the area for control of their generation.

In accordance with the present invention, the area-requirement signal as applied to unit 10 of station $A_1$, for example, is effective immediately and continuously to determine the speed of the fly-ball or equivalent speed-responsive device 13 of the governor of unit 10. Thus, upon deviation from the scheduled interchange of the area, the governor of unit 10, and of any other similarly controlled units of the area, is effective to re-position input valve 27 of the prime mover 28 of the unit and so change the generation of that unit in proper sense and by an amount related to the deviation to assist return of the area requirement to zero. In the simplified governor of FIG. 1, the device 13 is continuously rotated by a small synchronous motor 14 supplied from an auxiliary A.C. generator 15 in turn driven by the variable-speed motor 16. In the system of FIG. 1 and to permit use of conventional speed-responsive governors as area-requirement responsive governors, the frequency range of the output of generator 15 is in the neighborhood of the normal range of system frequency, usually 60 cycles plus or minus a few percent.

The excitation of motor 16 of FIG. 1 is provided or controlled by the high-gain amplifier 17 which may be of known electronic, magnetic or other type. The input circuit of amplifier 17 comprises a potentiometer network 18 including a tachometer generator 19 continuously driven by one or the other of motors 14 and 16, a potentiometer slidewire 20 and a split-potentiometer or bridge 21 including a slidewire 22 and a center-tapped resistor 23.

The contact of slidewire 22 is continuously positioned in accordance with the existing area-requirement as by the output shaft of the repeater-receiver 12A1 of station $A_1$. This receiver is connected by a telemetering link to the output of a corresponding transmitter included in the area-requirement computation block 12 at the load dispatcher's office. In FIG. 1, with the contact of slidewire 22 in position corresponding with zero area-requirement, the output voltage $e_1$ of bridge 21 is zero. With increasing positive area requirement, denoting need for increased area-generation, the contact of slidewire 22 is displaced to the right from its zero position so that the output voltage $e_1$ increases from zero in one sense. With increasing negative area requirement, denoting need for decreased area generation, the contact of slidewire 22 is displaced to the left from its zero position so that the output voltage $e_1$ increases from zero in the opposite sense. The output voltage $e_2$ of the tachometer generator 19 is proportional to the speed of motor 16 and therefore proportional to the speed of the fly-ball motor 14. Another output voltage $e_3$ is derived from potentiometer slidewire 20.

The relative polarity or phasing of the voltages $e_1$, $e_2$ and $e_3$ is such that $e_1$ subtracts from $e_3$ when the area requirement is positive; $e_1$ adds to $e_3$ when the area requirement is negative; and $e_2$ is always of opposite polarity or phasing to $e_3$. The object of network 18 is to establish between these voltages a relationship which for any existing area requirement and unit base-loading can be expressed as:

$$e_2 = e_3 + e_1 \tag{3}$$

where:

$e_2$ is considered as positive
$e_3$ is considered as positive
$e_1$ is considered as negative for positive area requirement and as positive for negative area requirement When this relationship does not prevail, voltage $e_2$ is automatically adjusted by action of amplifier 17 on the speed of motor 16 and therefore of tachometer generator 19 until balance is effected or restored. With slidewire 20 supplied by constant current from source 25, the magnitude of voltage $e_3$ may be preset, by adjustment of the slidewire contact, to a setting corresponding with the desired base-load generation of unit 10 for zero area requirement.

Thus so long as the area requirement is zero, the output of the network 21 is zero and the input to high-gain amplifier 17 is the difference between the tachometer voltage $e_2$ and the slidewire voltage $e_3$. Since the tachometer voltage $e_2$ is effectively a 100% feedback voltage, the motor 16 operates at a speed for which the voltage $e_2$ is but slightly different from and for practical purposes is essentially equal to the slidewire voltage $e_3$. Thus, at zero area requirement of area A, the speed of the governor fly-ball device 13 and hence the output of unit 10 corresponds with the base-load setting of slidewire 20 and remains so despite any changes in sytem frequency and the speed of all generating units, including unit 10, which are not accompanied by a change in area requirement. Such changes in system frequency are usually occasioned by change in load in remote areas as fully discussed in my aforesaid patents.

Continuing the discussion of network 18, it is now assumed that area A has a positive area requirement, i.e., that the total generation of area A is insufficient to meet its local load demands plus its scheduled commitment to the remainder of the distribution system. In such case, the contact of slidewire 22 is moved to the right from its zero position producing a voltage $e_1$, having a magnitude corresponding with the positive area requirement. This voltage $e_1$ is effectively subtracted from voltage $e_3$ so to unbalance the network 18 in sense and to extent corresponding with the positive area requirement. The speed of motor 16 accordingly decreases with consequent decrease of the tachometer voltage $e_2$ until it is arithmetically equal to $e_2$ minus $e_1$. This decrease in speed of motor 16 is effective through the change in frequency of the auxiliary generator 15 correspondingly to decrease the speed of the fly-ball motor 14. Accordingly, the fly balls 13 fall to a new position and in doing so effect further opening of the valve 27 correspondingly to increase the input to the prime mover 28 of the generator 29 of unit 10. At a rate determined by the characteristics of the unit 10, including its prime mover and its supply source, the output of unit 10 is increased. Thus, unit 10 and all other similarly controlled generating units of area A have their electrical output increased to obtain increased generation assisting area A in correction of its deviation from schedule.

As a generating unit, such as unit 10 of FIG. 1, picks up generation due to response of its area-requirement governor to a positive area-requirement, the area-requirement itself is correspondingly decreased. As this takes place, the contact of slidewire 22 is progressively moved back toward its original zero position by the area-requirement meter or repeater 12A1. This in turn would call for a progressively increasing speed of the tachometer generator 19 and of the fly-ball device 13 as driven by motor 14. These essentially concurrent actions proceed until a balance is established for Equation 3 and there has been a net reduction of area requirement and a net increase in unit generation for unit area-assist action as determined quantitatively by the prevaling area-requirement/unit-generation characteristic later discussed in connection with FIG. 2. In other words, the reduction in area-requirement can be large or small as a result of the assist-action of unit 10, depending on the preset slope of the area-requirement/unit-generation characteristic of FIG. 2. The sustained increase in generation required to return the area-requirements to zero while meeting the increased load of the area may be supplied by other units of the area whose generation is increased during or after the aforesaid assist action of unit 10 and of other similarly controlled units of the area, or it may be supplied by unit 10 and similar units by manual or automatic adjustment of slidewire 20 thereof.

It is now assumed that area A has a negative area requirement, i.e., that the total generation of area A is more than sufficient to meet its local load plus its scheduled commitment to the other areas of the system. Under this circumstance, the slidewire 22 is adjusted by the area requirement repeater 12A1 to the left from its zero point. The speed of motor 16 accordingly increases with consequent increase of tachometer voltage $e_2$ until network 18 is again substantially rebalanced.

The increase in speed of motor 16 is effective through the auxiliary generator 15 accordingly to increase the speed of the fly-ball motor 14 and so reduces the input to prime mover 28 under control of the fly-ball device 13. Thus, upon occurrence of a negative area-requirement for area A, the unit 10 and all other similarly controlled generating units of area A decrease their generation to assist the area in correction of its deviation from the scheduled interchange with other areas of the system.

As the decrease in area generation reduces the magnitude of the negative area-requirement, the meter or repeater 12A1 moves the contact of slidewire 22 back toward its original zero position, calling for a reduction of the speed of motor 16, under control of network 18. This calls for a progressively decreasing speed of tachometer generator 19 and of the fly-ball device driven by motor 14. These essentially concurrent actions proceed until a balance is established for Equation 3 and there has been a net reduction of area-requirement and a net decrease in unit-generation for unit area-assist action as determined quantitatively by the prevailing area-requirement/unit-generation characteristic. The reduction in area-requirement due to the assist action of unit 10 can be large or small depending upon the preset slope of the area-requirement/unit generation characteristic of that unit. The sustained decrease in generation required to return the area-requirement to zero while meeting the decreased load of the area may be accommodated by other units of the area whose generation is decreased during or after the aforesaid assist action of unit 10 and of other similarly controlled units of the area, or it may be accommodated by unit 10 and similar units by manual or automatic adjustment of slidewire 20 thereof.

From the foregoing description, it will be appreciated that the governor system of unit 10 has an area-requirement governing characteristic similar to that exemplified, for example, by Curve R of FIG. 2 if the input/output relation of the turbo-generator is linear. In short, the generation of the unit is varied as a function of the area-requirement rather than as a function of the speed of the unit or of system-frequency.

It is to be noted that in areas operating under a frequency-biased scheduled interchange, it is not necessary to introduce any unit frequency-bias factor into the control of any generating unit having an area-requirement governor of the type herein described. Such introduction is otherwise necessary with a mandatory type of control, as set forth in my Patent 2,866,102, to avoid the effect of system-frequency upon the regulation of individual units of an area. Under a frequency-biased interchange schedule, when a load-increase occurs in a remote area and is accompanied by a drop in system-frequency, the local area is obligated temporarily to supply generation for helping the remote area initially to meet the demand for increased generation. Although the inputs of local units controlled as above described are not varied with change of system-frequency, the remote load-increase accompanied by drop in system-frequency but without corresponding change in tieline power flow produces an area-requirement signal in the local area. The response of the local area generation to such area-requirement signal returns the local area to its schedule. With the area-requirement governors, the setting of the area-frequency bias for the interchange schedule provides an assigned sensitivity to load changes occurring in remote areas, not only for the local area as a whole but for individual units of that area, each unit in accordance with its area-requirement/unit generation characteristic.

The slope of this area-requirement governing characteristic, i.e., the extent to which the unit-generation is changed for a given positive or negative area-requirement, depends upon the extent to which the voltage $e_1$ is increased for the corresponding movement of the contact of slidewire 22 from its center position. Thus, by changing the setting of rheostat 31, or otherwise changing the total voltage drop across slidewire 22, the general slope of the area-requirement governing characteristic may be decreased or increased to increase or decrease the assist action of unit 10 for a given change in area-requirement. For example, to change the slope of the area-requirement governing characteristic of unit 10 from that of curve R to that of curve $R_1$, the rheostat 31 or equivalent is adjusted to decrease the current supplied by source 24 to the network 21 so to decrease the voltage gradient of slidewire 22. If any particular non-linear governing characteristic is desired, the slidewire 22 may be graded to provide suitable unequal increments of voltage change for successive equal increments of movement of slidewire 22 relative to its contact. Thus, any desired shape or slope of the area-requirement governing characteristic for unit 10 may be obtained.

The effect of changing the setting of slidewire 20 is to shift the intercept of the area-requirement governing characteristic with the zero area-requirement axis; for example, by resetting the slidewire 20 to decrease the voltage $e_3$, the characteristic R affording a base generation $G_b$ can be displaced to the position $R_2$ to obtain a higher base generation $G_{b1}$. Alternatively, the intercept and slope of the area-requirement governing characteristic may be changed by adjusting the loading spring 30 and the mechanical linkage between the fly-ball and the valve as in conventional speed governors.

Preferably, the generator 15 is a variable-frequency alternator whose mid-frequency substantially corresponds with the normal frequency, usually 60 cycles of the power distribution system and the fly-ball motor 14 is a synchronous motor. Thus, in event of an emergency, such as failure of the telemetering channel or equipment or approach to excessive speed of generator 29, the governor motor 14 may be switched, as by relay 32, to the power lines for emergency operation. In such case, of course, the governor of unit 10 is no longer an area-requirement governor but changes the input to prime mover 23 in accordance with unit speed.

In the particular arrangement shown in FIG. 1, the emergency changeover relay 32 may be of the over-voltage manually-reset lock-out type and supplied from a small tachometer generator 60 mechanically driven from the generating unit 10. Thus, should the speed of the unit 10 for any reason approach an excessively high value, the correspondingly higher voltage output of the tachometer generator 60 will trip the relay 32 and so transfer the supply connections of the fly-ball motor 14 from the governor generator 15 to the power generator 29 of unit 10. Hence, in effect, the relay 32 is an over-speed relay.

When it is desired that more than one unit of a station provide the area-assist action above described, the auxiliary generator 15 may be connected, as by line 33, to the fly-ball motor or motors of the other generating unit or units. In such case, the governing characteristics of the different units may be individually adjusted as above indicated by adjustment of the loading spring and/or the valve linkage of the corresponding generating unit. Alternatively, as indicated by line 34, the contact of slidewire 22 may be ganged with the contact of the corresponding slidewire of each of one or more other networks similar to network 18 and similarly utilized to control the speed of the governors of such generating units. In this latter arrangement, the different area-requirement governing characteristics can be assigned to different generating units by adjustment of slidewires 20 and 31 of the corresponding networks 18.

Except in respects specifically discussed below, the area-requirement governor shown in FIG. 1A is similar to that of FIG. 1. The corresponding elements of both figures are identified by the same reference characteristics to facilitate reading of the description of the operation of FIG. 1 upon FIG. 1A.

In FIG. 1A, the driving power supplied to fly-ball motor 14 comes from the power line but the speed of motor 14 is made to vary in sense and to extent corresponding with any existing deviation from the scheduled interchange of area A to provide an area-assist action by a control action of network 18. The fly-ball motor 14 may, for example, be a universal motor in which case the control device 15R may be a rheostat whose contact is positioned by reversible motor 16 in the output circuit of amplifier 17. Alternatively, the fly-ball motor 14 may be a synchronous motor in which case the control device 15R may be a rotary transformer or continuous phase-shifter whose rotor is driven by a reversible motor 16. Any tendency for change in speed of motor 14, due to change in line voltage or frequency, is promptly corrected by feedback action of tachometer generator 19 of network 18. Thus, as in FIG. 1, the generation of unit 10 is held constant at the base-load setting of rheostat 20 so long as the area-requirement is zero, but is raised or lowered to provide an area-assist action by unit 10 whenever the area is not meeting its schedule.

When it is desired that a generating unit shall not only provide an area-assist action but shall also share in the sustained generation changes of its area by a supplementary control introduced into the governor system, the arrangement shown in FIG. 3 may be used. In FIG. 3, as in FIGS. 1 and 1A, the fly-balls 13A of the governor are driven by motor 14A at a preselected speed which is constant so long as the area-requirement is zero. Upon occurrence of a positive area requirement, the motor 14A drives the fly-balls at lower speed and, accordingly, the arm 35 swings clockwise about its pivot 36 to a new position corresponding with the magnitude of that positive area requirement. Conversely, during existence of a negative area requirement, the motor 14A drives the fly-balls at higher speed and, accordingly, arm 35, for rebalance of the biasing and centrifugal forces, is displaced in counterclockwise direction about pivot 36 to a new position corresponding with the magnitude of that negative requirement.

Such motion of the fly-ball arm 35 is effective, through levers 37, 38 and links 39—41, to move the pilot valve 42 in one direction or the other from the neutral position shown to permit flow of fluid from supply line 43 to one end or the other of the actuator cylinder 44. Accordingly, the piston 45 moves the input valve 27A of the prime mover in sense dependent upon the sense of deviation from area schedule. The piston rod 46 is so coupled, by links 47—48 and lever 49, to lever 38 that when the change in setting of valve 27A corresponds with the displacement of fly-ball arm 35, the pilot valve 42 has been returned to its neutral position. Thus, the change in setting of the valve 27A is proportional to the deviation from area schedule by virtue of the mechanical feedback afforded by the linkage 47—49.

The slope of the area requirement/unit generation charactristic of the governor system of FIG. 3 may be varied by adjustment of the valve linkage: specifically, the fulcrum or pivot 50 of lever 37 may be shifted as by knob or gear 51 to change the ratio of its lever arms. This mechanism thus serves generally the same purpose as rheostat 31 of FIGS. 1 and 1A: the relative participation of several generating units so controlled to provide an area-assist action may be preset by adjustment of their respective valve linkages as generally suggested above.

For any given position of the pivot 52 of lever 49, the speed-responsive device 13A of the governor is effective as above described to vary the setting of the prime-mover valve 27A in accordance with the sense and magnitude of the area requirement and so provide an area-assist action when an area requirement exists. The pivot 52 of lever 49 may be raised or lowered manually to a fixed position for presetting of a desired base load of unit 10A—as is done by manual setting of slidewire 20 in FIGS. 1 and 1A. As indicated in FIG. 3, the position of pivot 52 may be varied by reversible motor 53 controlled by supplementary sustained-generation control signals produced by a controller 54. This sustained-generation controller may, for example, be of the type disclosed in any of United States Letters Patents 2,773,994, 2,866,102, 2,836,730 or 2,836,731: the sustained-generation assignments may be on the basis of a system affording flexible programming of load distribution among the units or the basis of a system with rigid programming of load distribution on any desired economic consideration. With such supplementary control introduced into the area-governor system, the sustained-generation of unit 10 is varied in accordance with the varying total sustained generation required of area A to meet its own varying load as well as to satisfy its scheduled obligation to the power distribution system.

Such sustained-generation control can be introduced into the area-governor systems of FIGS. 1 and 1A, as by using the motor 53 and controller 54 to adjust the slidewire 20 of network 18 in accordance with the sustained-generation requirement of unit 10 or by supplying to slidewire 20 a source voltage which varies in accordance with the sustained-generation requirement of the controlled generating unit.

In FIG. 3, the fly-ball motor 14A is powered by the A.C. output of amplifier 55 whose input frequency is varied in correspondence with the sense and magnitude of the area requirement. Specifically, as in the aforesaid Phillips patent, for example, the master controller 12 at the load dispatcher's office may include a telemetering transmitter whose sub-carrier or modulation-frequency is varied from a reference value corresponding with zero area requirement in accordance with the existing deviation from schedule. At each generating station that is to provide an area-assist action, there is a station receiver 12A1 tuned to the carrier frequency of the telemetering transmitter. Such receiver includes a demodulator which supplies to amplifier 55 associated with unit 10A and to corresponding amplifiers for other units of the station an input signal whose frequency represents the existing area requirement. Thus, the speed of the synchronous fly-ball motor 14A deviates from normal in accordance with the sense and extent of any existing area requirement. Preferably, the modulation frequency at zero area requirement corresponds with the normal power line frequency, so that in event of mal-functioning of the communication equipment or link, the fly-ball motor 14A may, as in FIG. 1, be connected to the power line as by relay 32B. Of course, with such emergency connection, the governor no longer serves as an area-requirement governor but is temporarily a conventional speed-type governor.

In the arrangement shown in FIG. 4, the fly-ball governor 13B is synchronously driven from the generating unit 10B but the governor is so set that valve 27C has no appreciable throttling action throughout the normal range of frequency variation of the system to which it supplies power. Except when the speed of unit 10B approaches an excessively high value, as may occur for example upon tripping of circuit-breakers connecting it to the system, the input to its prime mover 28B is regulated by an area-requirement governor system in manner similar to arrangements herein previously described. Specifically, the network 18B, like the network 18 of FIGS. 1 and 1A, includes sources for respectively producing a voltage $e_3$ corresponding with generation required of the unit under conditions of zero area requirement, an opposing voltage $e_2$ corresponding with the input to the prime mover of the unit, and a voltage $e_1$ which is zero under conditions of zero area-requirement, but which, as explained in discussion of FIG. 1, is varied in either sense from zero to correspond with an existing positive or negative area requirement.

Upon occurrence of a positive area-requirement, the network 18B becomes unbalanced in sense and to extent corresponding with the positive area-requirement signal $e_1$. The motor 16 thereupon operates in direction to increase the opening of valve 27B until the increase in output voltage $e_2$ of slidewire 19B mechanically coupled to valve 27B is sufficient to restore the network 18B to balance. Conversely, upon occurrence of a negative area requirement, the resulting adjustment of slidewire 22 unbalances network 18B in opposite sense and to extent corresponding with the negative area-requirement signal $e_1$. Motor 16 thereupon operates in reverse direction to decrease the opening of input valve 27B until the decrease in output voltage $e_2$ of slidewire 19B is sufficient to restore balance of network 18B. Thus, except under emergency conditions, the position of valve 27B and therefore the input to unit 10B is continuously adjustable in response to any deviation from area schedule to provide area-requirement governor action.

It should be understood the invention is not limited to the species illustrated and described, but also comprehends other arrangements within the scope of the appended claims.

What is claimed is:

1. A system for controlling the generation of a generating unit of an area operating under a power interchange schedule with at least one other interconnected generating area comprising means for producing an area-requirement signal varying with deviations from said area schedule, means including a continuously rotating device whose speed determines the input to the generating unit, and means for applying said area-requirement signal to said device to vary its speed in accordance with the sense and magnitude of said signal.

2. A system for controlling the generation of a generating unit of an area operating under a power interchange schedule with at least one other interconnected generating area comprising means for producing an area-requirement signal varying with deviations from said area schedule, means including a continuously rotating device whose speed determines the input to the generating unit, motor means for effecting continuous rotation of said device, and means responsive to said area-requirement signal for varying the speed at which said device is rotated by said motor means to effect variation of the input to said generating unit in accordance with the deviations from said area schedule.

3. A system as in claim 2 additionally including means for adjusting the slope of the area-requirement/unit generation characteristic of the controlled unit.

4. A system as in claim 2 including additional means for shifting the zero area-requirement intercept of the area-requirement/unit generation characteristic of the controlled unit.

5. A system as in claim 4 in which said additional means presets the speed of said device to the value for which the input to the generating unit is of desired value for zero deviation from the area schedule.

6. A system as in claim 4 in which said additional means is responsive to changes in the sustained-generation requirement of the unit correspondingly to shift the zero area-requirement intercept of the area-requirement/unit generation characteristic of the controlled unit.

7. A system for controlling the generation of an A.C. generating unit of an area operating under a power interchange schedule with at least one other interconnected generating area comprising means for producing an A.C. signal whose frequency varies in accordance with deviations from said schedule, means including a synchronous motor whose speed determines the input to the generating unit, and means for connecting said motor to said signal-producing means for energization of said motor by said signal for operation at a speed determined by the frequency of said signal.

8. A system for controlling the generation of an A.C. generating unit of an area operating under a power interchange schedule with at least one other interconnected generating area comprising means for producing an A.C. signal whose frequency varies in accordance with deviations from said schedule, means including a synchronous motor whose speed determines the input to the generating unit, means for connecting said motor to said signal-producing means for energization of said motor by said signal for operation at a speed determined by the frequency of said signal, and relay means effective under emergency conditions for transferring connections of said motor to said generating unit.

9. A system for controlling the generation of an A.C. generating unit of an area operating under a power interchange schedule with at least one other interconnected generating area comprising means for producing an area-requirement signal varying in accordance with deviations from said area schedule, means including a speed-responsive device for varying the input to the generating unit and a synchronous motor for driving said speed-responsive device, and an alternator normally connected to said synchronous motor and operated at a speed varying with said area-requirement signal to vary the input to said generating unit in accordance with deviations from the area schedule.

10. A governor system normally incapable of directly responding to changes in frequency for controlling the generation of a generating unit of an area operating under a power-interchange schedule with at least one other interconnected generating area comprising means for producing a signal corresponding with the sustained generation requirement of the unit, means for producing an opposing signal corresponding with the input to the unit, means for producing a signal of sense and magnitude corresponding with any existing deviation from said interchange schedule of the area, and means continuously effective to vary the input to said generating unit solely in accordance with the algebraic summation of the concurrent magnitudes of said signals.

11. A governor system normally incapable of responding to changes in frequency for controlling the generation of a generating unit of an area operating under a frequency-biased power-interchange schedule with at least one other interconnected generating area and characterized by assigned sensitivity to the effect of changes in load occurring in said other interconnected area comprising means for producing an area-requirement signal varying in sense and magnitude with deviations from said schedule of the area, means adjustable to vary the input to said generating unit, and means continuously receiving said area-requirement signal and controlling said adjustable means to vary the input to said unit solely in correspondence with the existing deviation from area schedule.

References Cited in the file of this patent

UNITED STATES PATENTS 2,836,730  Early _____ May 27, 1958